United States Patent
Edsinger et al.

(10) Patent No.: US 9,509,195 B1
(45) Date of Patent: Nov. 29, 2016

(54) EMBEDDED ENCODER FOR AN OUTRUNNER BRUSHLESS MOTOR

(71) Applicant: REDWOOD ROBOTICS, INC., San Francisco, CA (US)

(72) Inventors: Aaron Edsinger, San Francisco, CA (US); Matt Carney, Oakland, CA (US)

(73) Assignee: REDWOOD ROBOTICS, INC., San Francisco, CA (US)

(*) Notice: Subject to any disclaimer, the term of this patent is extended or adjusted under 35 U.S.C. 154(b) by 277 days.

(21) Appl. No.: 14/246,205

(22) Filed: Apr. 7, 2014

Related U.S. Application Data

(60) Provisional application No. 61/815,146, filed on Apr. 23, 2013.

(51) Int. Cl.
| | |
|---|---|
| *H02K 11/00* | (2016.01) |
| *G01D 5/347* | (2006.01) |
| *H02K 5/16* | (2006.01) |
| *H02K 5/10* | (2006.01) |

(52) U.S. Cl.
CPC ........... *H02K 11/0015* (2013.01); *H02K 5/10* (2013.01); *H02K 5/163* (2013.01); *H02K 11/0026* (2013.01)

(58) Field of Classification Search
CPC ................ H02K 11/00; G01D 5/26
USPC .......... 310/68 B, 68 R, 71, 68 C; 250/231.13
See application file for complete search history.

(56) References Cited

U.S. PATENT DOCUMENTS 5,708,496 A * 1/1998 Barnett ............ G01D 5/34738
250/231.13
6,380,649 B1 * 4/2002 Brown ................... F16C 19/52
310/36

FOREIGN PATENT DOCUMENTS

JP          2007153495 A  *  6/2007

* cited by examiner

*Primary Examiner* — Jose Gonzalez Quinones
(74) *Attorney, Agent, or Firm* — McDonnell Boehnen Hulbert & Berghoff LLP

(57) ABSTRACT

An example embedded encoder for an outrunner brushless motor is provided. An example motor includes a motor shaft, a stationary stator, a rotor coupled to the motor shaft and provided external to the stationary stator for rotating around the stationary stator to cause rotation of the motor shaft, and a faceplate coupled to the stationary stator that includes a cavity. The motor also includes an encoder embedded into the cavity of the faceplate that comprises a code wheel coupled to the motor shaft and a read head for providing an output indicative of an angular position of the code wheel. The faceplate provides alignment between the code wheel and the read head.

20 Claims, 4 Drawing Sheets

EMBEDDED ENCODER FOR AN OUTRUNNER BRUSHLESS MOTOR

CROSS-REFERENCE TO RELATED APPLICATION

The present application claims priority to U.S. Patent Application Ser. No. 61/815,146, filed on Apr. 23, 2013, the entire contents of which are herein incorporated by reference.

BACKGROUND

Unless otherwise indicated herein, the materials described in this section are not prior art to the claims in this application and are not admitted to be prior art by inclusion in this section.

A brushless DC motor (BLDC) usually includes windings (or a stator) that are stationary and magnets (or a rotor) rotate relative to the windings. Example BLDC configurations place the rotor internal to the stator such that the external motor housing is stationary. This allows the housing to be attached to a fixed chassis with no external moving parts.

An outrunner brushless DC motor configuration includes the rotor external to the stator such that the external motor housing is spinning. Thus, for this type of motor, an outer shell of the motor spins around the internal windings. The stator is typically connected to a faceplate at a front of the motor and a back of the motor spins. This faceplate can be attached to the fixed chassis. Outrunner BLDC motors are common and can be found in CD-ROM computer drives, radio-controlled (RC) airplanes, and electric bicycles, for example.

In many cases, it is desired to attach a motor angle sensor, such as an encoder, to the motor rotor to provide advanced control of the motor. With a standard BLDC motor, this can be accomplished by attaching the encoder to a back of the motor such that a head of the encoder is fixed to the motor housing and a wheel of the encoder is attached to a back of the rotating motor shaft. The head and wheel of the encoder can be registered directly to local features on the motor housing to ensure precise concentricity and angular alignment. Poor alignment can cause encoder errors.

Such a mounting arrangement is generally not possible for outrunner motors as the motor housing is rotating. Instead, sometimes the head of the encoder is mounted to the chassis while the wheel is mounted to the motor housing, which can create a larger tolerance loop than in the standard configuration. Precise alignment of the head and wheel are dependent on chassis tolerances, and therefore, encoder performance can be more susceptible to errors. This may also increase complexity of the chassis structure and a size of the overall packaging.

SUMMARY

In one example, an outrunner brushless motor is provided. The motor includes a motor shaft, a stationary stator, a rotor coupled to the motor shaft and provided external to the stationary stator for rotating around the stationary stator to cause rotation of the motor shaft, and a faceplate coupled to the stationary stator that includes a cavity. The motor also includes an encoder embedded into the cavity of the faceplate that comprises a code wheel coupled to the motor shaft and a read head for providing an output indicative of an angular position of the code wheel. The faceplate provides alignment between the code wheel and the read head.

In another example, an outrunner brushless motor comprises a rotatable motor shaft, a faceplate for coupling to a chassis and having an opening through which the rotatable motor shaft is provided, and the faceplate includes a cavity. The motor also includes an encoder embedded into the cavity of the faceplate that comprises a code wheel coupled to the rotatable motor shaft and a read head for providing an output indicative of an angular position of the code wheel. The faceplate provides alignment between the code wheel and the read head.

In another example, an outrunner brushless motor comprises a rotatable motor shaft, a faceplate having an opening through which the rotatable motor shaft is provided, and the faceplate is provided at a front of the motor such that the front of the motor is stationary and a back of the motor rotates with the rotatable motor shaft. The faceplate also includes a cavity. The motor also includes an encoder embedded into the cavity of the faceplate for providing an output indicative of an angular position of the motor, and the encoder comprises a code wheel coupled to the rotatable motor shaft and a printed circuit board (PCB) for providing an output indicative of an angular position of the code wheel. The faceplate provides alignment between the code wheel and the PCB.

In still other examples, computing devices, methods and computer program products including instructions executable by computing devices or by one or more processors to perform functions of the methods are provided. The methods may be executable for operating an encoder within a motor, or for determining an angular position of a motor, for example.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, an embedded encoder for an outrunner brushless motor is provided. An example motor includes a motor shaft, a stationary stator, a rotor coupled to the motor shaft and provided external to the stationary stator for rotating around the stationary stator to cause rotation of the motor shaft, and a faceplate coupled to the stationary stator that includes a cavity. The motor also includes an encoder embedded into the cavity of the faceplate that comprises a code wheel coupled to the motor shaft and a read head for providing an output indicative of an angular position of the code wheel. The faceplate provides alignment between the code wheel and the read head to reduce any tolerances required for precise alignment since the encoder is a component of the faceplate, for example.

Figure 1:
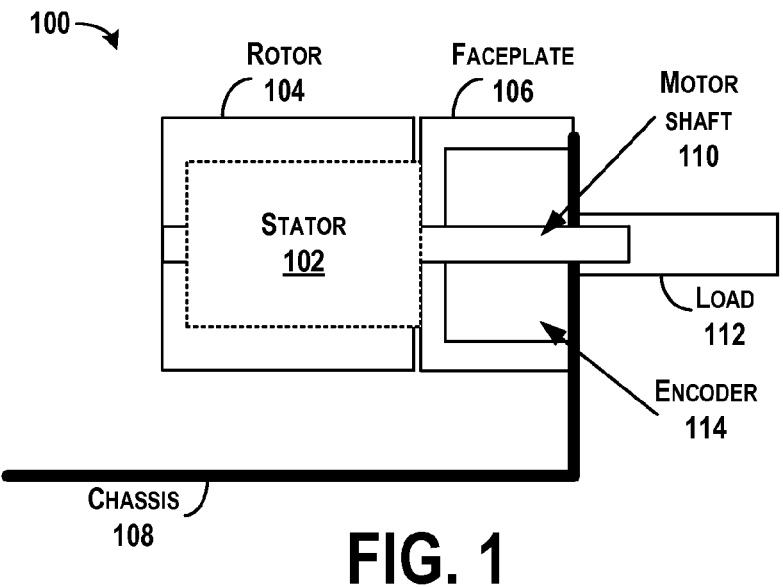
FIG. 1 is a block diagram of an example outrunner brushless motor.

Referring now to the figures, FIG. 1 is a block diagram of an example outrunner brushless motor 100. The motor 100 includes a stator 102 and a rotor 104 external to the stator 102 such that the external rotor 104 spins or rotates around the stator 102. The stator 102 is stationary and is coupled to a faceplate 106 at a front of the motor 100, and a back of the motor 100 including the rotor 104 spins. The faceplate 106 may be any number of metals, and can be attached to the stator 102 through shaft bearings and to a fixed chassis 108 by screws, bolts, or other attachment mechanisms. The faceplate 106 may include holes that allow the faceplate 106 to attach or mate to corresponding features on the chassis 108.

The stator 102 may be a permanent magnet or an electromagnet, and thus, can include a coil comprising windings. The windings may be copper or aluminum, or other conducting material.

The rotor 104 is a non-stationary portion of the motor 100, which rotates because wires of the windings in the stator cause a magnetic field of the motor 100 arranged so that a torque is developed about an axis of the rotor 104.

In an example operation of the motor 100, the faceplate 106 and the stator 102 (windings) are stationary, and the stator 102 is excited by DC brushless motor controllers. A direct current (switched on and off at high frequency for voltage modulation) is passed through non-adjacent windings together, and the group so energized is alternated electronically based upon rotor position feedback. In some examples, a number of permanent magnets in the rotor 104 does not match the number of stator poles, however. Advance of electromagnetic impulses around the axis of the motor 100 proceeds faster than the rotor 104 turns. With more magnet poles, maximum torque is increased, while a speed of rotor advance is decreased in proportion to the ratio of magnet poles to stator poles.

The motor 100 also includes a motor shaft 110 coupled to the rotor 104, and the rotor 104 rotates around the stationary stator 102 to cause rotation of the motor shaft 110, which couples to a load 112, for example. Thus, the motor shaft 110 is a rotatable motor shaft. The load 112 may comprise any number of components, such as for example, a pulley system, an actuator system, or other components used in robotic manipulators or robotics arms. In some examples, the chassis 108 may comprise a frame of a robotic arm, and a load may be any object that the robotic arm moves, picks up, or interacts with.

To configure the motor 100, the faceplate 106 may be rigidly attached to the stator 102 by a press fit and/or adhesive. The rotor 104 revolves around the stator 102 by shaft bearings, and the motor shaft 110 can be rigidly attached to the rotor 104 by a press fit and/or adhesive, for example. The motor shaft 110 is constrained by shaft bearings so as to be concentrically aligned to the faceplate 106, for example.

The faceplate 106 includes a cavity, and the motor 100 includes an encoder 114 embedded into the cavity of the faceplate 106. The faceplate 106 has an opening through which the motor shaft 110 is provided, and the encoder 114 has an opening through which the motor shaft 110 is provided. The faceplate 106 is stationary and the rotor 104 rotates relative to the faceplate 106 to cause rotation of the motor shaft 110 that is detected by the encoder 114.

The encoder 114 comprises a code wheel attached to the motor shaft 110 and a read head attached to the faceplate 106. The read head provides an output indicative of an angular position of the code wheel that rotates due to rotation of the motor shaft 110 (described more fully below). The faceplate 106 provides alignment between the code wheel and the read head. A tolerance loop from the code wheel to the read head of the encoder 114 is therefore small, resulting in a lower likelihood of sensor errors due to encoder misalignment.

In an example operation, the encoder 114 converts the angular position or motion of the motor shaft 110 to an analog or digital code. The encoder 114 may be an absolute or incremental (relative) encoder. An output of an absolute encoder indicates a current position of the motor shaft 110. An output of an incremental encoder provides information about the motion of the motor shaft 110, which may be further processed into information such as speed, distance, and position, for example.

The encoder 114 may be any type of encoder or motor angle sensor, such as an optical encoder, a reflective encoder, or a transmissive encoder, for example.

Within the example motor 100, the encoder 110 is precisely attached to the motor 100 such that a tolerance loop is minimized and overall packaging is compact. Since the encoder 114 is embedded into the faceplate 106 of the stator 102, the tolerance loop of the faceplate 106 and the encoder 114 interface is more controlled, than by having the encoder 114 mounted to the chassis 108, as in other configurations. Further, embedding the encoder 114 into the faceplate 106 enables precise alignment of the encoder 114 code wheel and read head that is independent on the chassis 108 tolerances.

The faceplate 106 may form a structural connection to the chassis 108, and thus, embedding the encoder 114 within a cavity of the faceplate 106 enables the chassis 108 to attach directly to the faceplate 106.

Using an example outrunner motor configuration, as shown in FIG. 1, the encoder 114 can be integrated within the motor 100, and provided in an area other than a back of the motor 100 that rotates. For instance, since a body of the motor 100 rotates, e.g., rotor 104 rotates around the stator 102, the encoder 114 is provided within the faceplate 106. Furthermore, an integrated encoder can, in some instances, remove requirements for precise chassis alignment and tolerances.

Figure 2:
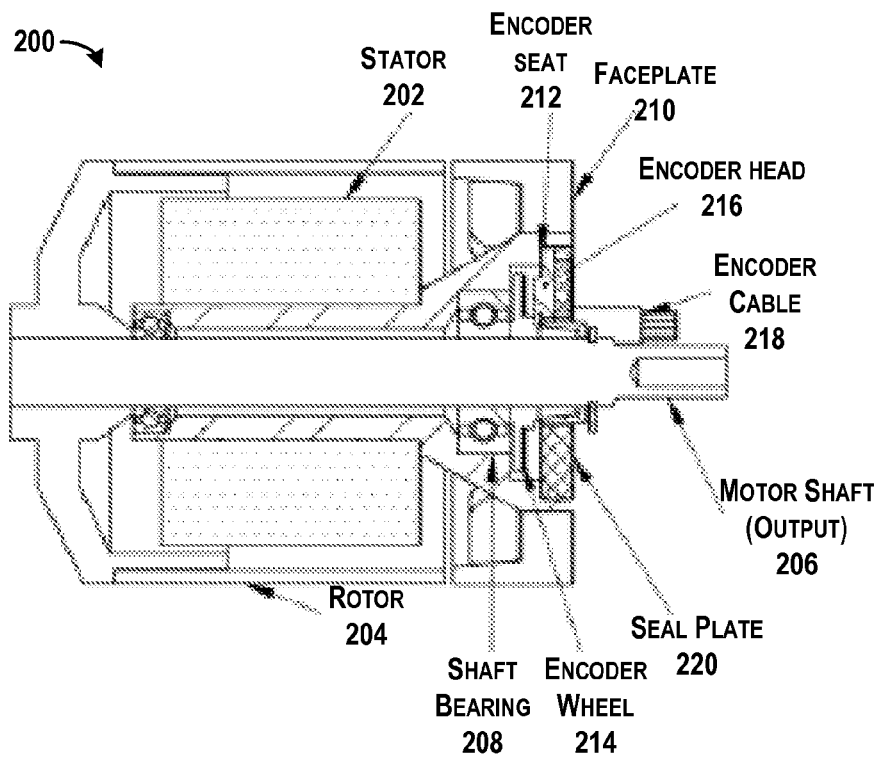
FIG. 2 illustrates example internal components of an outrunner brushless motor.

FIG. 2 illustrates example internal components of an outrunner brushless motor 200. The motor 200 includes a stator 202, and a rotor 204 external to the stator 202. A motor shaft 206 couples to the rotor 204 and rotation of the rotor 204 around the stator 202 causes rotation of the motor shaft 206, which outputs to a load. A shaft bearing 208 supports the motor shaft 206, and a faceplate 210 couples to the shaft bearing 208 to enable the motor shaft 206 to rotate within the faceplate 210. In this example, the supporting shaft bearing 208 is moved back from a mounting (front) face of the faceplate 210 towards the rotor 204. This opens up space between the shaft bearing 208 and the faceplate 210 for an encoder. The shaft bearing 208 may have an increased load capacity to counteract increased cantilevered load resulting from a relocation, for example.

As shown in FIG. 2, the motor 200 includes the faceplate 210 with a cavity machined into the faceplate 210 such that the cavity can hold encoder components and provide precision alignment features. For instance, the faceplate 210 includes an encoder seat 212 into which components of the encoder are positioned. The encoder seat 212 may be machined within the cavity of the faceplate 210. The encoder includes an encoder wheel 214 provided into the encoder seat 212, and an encoder head 216 is provided adjacent the encoder wheel 214. An encoder cable 218 couples to the encoder head 216 and may be soldered directly to the encoder head 216 or attached via a connector. The cable 218 can exit through a front face of the faceplate 210, as shown, or through a side via a channel machined into the faceplate 210, for example.

The encoder wheel 214 may have a diameter smaller than a diameter of the cavity of the faceplate 210 so as to fit within the cavity. The encoder wheel 214 may include a code wheel that is coupled to the rotatable motor shaft 206 adjacent to the shaft bearing 208 and rotates with rotation of the motor shaft 206, and the encoder head 216 is coupled to the faceplate 210 and remains stationary.

In one example, the encoder wheel 214 comprises a reflective code wheel that is attached to the motor shaft 206 just in front of the shaft bearing 208. The encoder read head 216 may comprise a printed circuit board (PCB) shaped to fit inside of the faceplate 210, and a chip for reading a position of the reflective code wheel. In further examples, the encoder read head 216 may incorporate other items such as microcontrollers, communication bus drivers, and also additional sensors such as a temperature sensor to measure a temperature within the cavity of the faceplate 210. Alignment between the chip and the code wheel may be precise and repeatable for proper encoder operation due to securing the components within the faceplate 210.

In operation, the rotor 204 rotates around the stator 202, causing rotation of the motor shaft 206 and the encoder wheel 214. The encoder head 216 may read a position of the encoder wheel 214, and output information of the position through the encoder cable 218. In one example, for an absolute encoder, the encoder wheel 214 includes multiple code rings with various binary weightings that provide a data word representing an absolute position of the encoder within one revolution when read by the encoder read head 216. In another example, for an incremental encoder, the encoder wheel 214 contains opaque sections that are equally spaced to deflect light while transparent sections allow light to be passed through, and the light that shines through is received by the encoder read head 216 to produce an electrical signal output. Incremental encoders can be referenced to a home position by using index pulses, for example.

In the example motor 200, a tolerance loop between the encoder and the rotatable motor shaft 206 is small as the encoder read head 216 position is registered directly to the faceplate 210 by a machined feature of the encoder head seat 212. Therefore, alignment between the read head 216 and the encoder code wheel 214 is subject to machining tolerances of the faceplate 210. The encoder head 216 may be attached to the faceplate 210 with screws, a press fit, or adhesive, for example. Assembly of the faceplate 210 and encoder components may include features to ensure precise and repeatable alignment during installation, such as holes in the encoder head 216 that mate to pins in the faceplate 210, for example.

The motor 200 may also include a removable seal plate 220, installed after the encoder components are installed, to seal the encoder from dust, water, etc. by closing the cavity of the faceplate 210 from an external environment. As shown in FIG. 2, a seat may be machined into the faceplate 210 into which the seal plate 220 seats against. The seal plate 220 may be installed with screws, a press fit, or adhesive, for example. Additionally, a gasket or o-ring seal may be used as well.

In some examples, the cavity of the faceplate 210 includes an indentation into which the encoder components are placed and within which the seal plate 220 is provided to close the cavity such that the seal plate 220 is substantially flush with the faceplate 210.

Figure 3A:
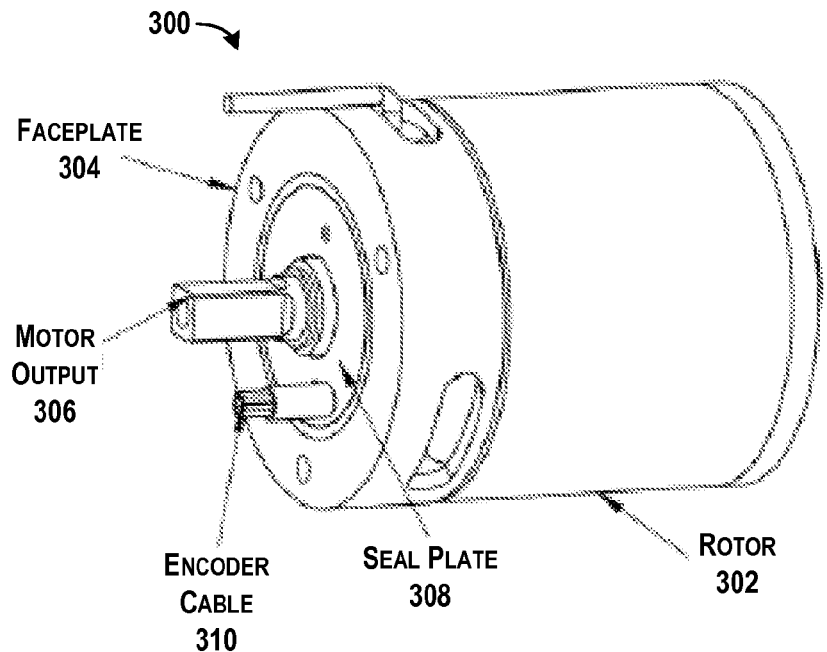
FIGS. 3A-3B illustrate an external view of an example outrunner brushless motor.
Figure 3B:
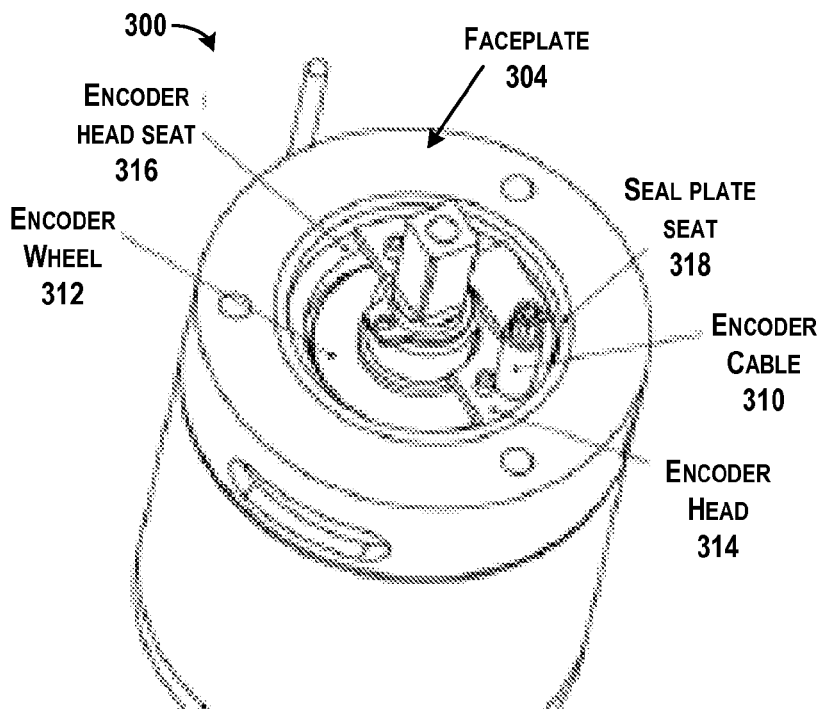

FIGS. 3A-3B illustrate an external view of an example outrunner brushless motor 300. In FIG. 3A, the motor 300 is shown to include a rotor 302 coupled to a faceplate 304. The faceplate 304 may be a stator faceplate that couples to a stator internal to the rotor 302. A motor output 306 is shown, which may include a rotatable motor shaft that exits from the faceplate 304. A seal plate 308 is provided to seal the faceplate 304. Within the faceplate 304, an encoder is embedded, and thus, the seal plate 308 provides a seal for the encoder. An encoder cable 310 is shown existing from the seal plate 308 as well.

In FIG. 3B, the motor 300 is shown to include an encoder having an encoder wheel 312 and an encoder head 314. An encoder head seat 316 is provided in the faceplate 304 onto which the encoder head 314 is positioned to fit. In addition, a seal plate seat 318 is also provided in a surface of the faceplate 304 into which the seal plate 308 is positioned to fit.

Figure 4A:
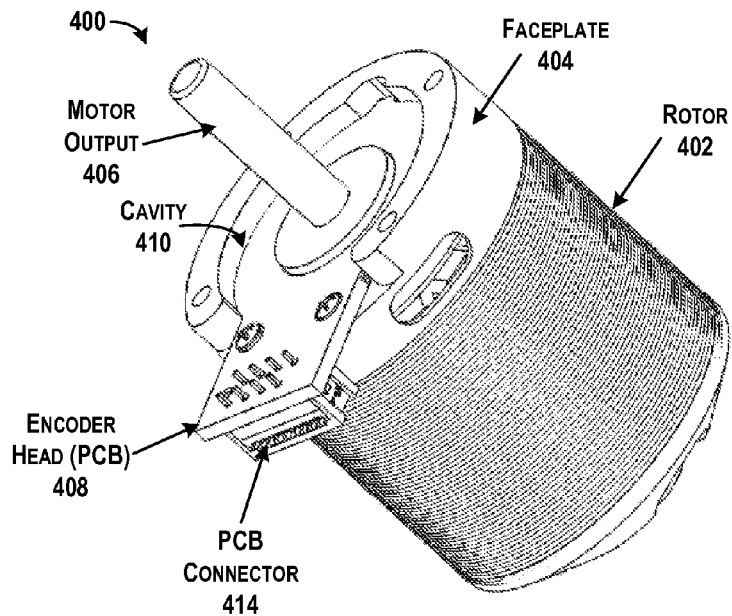
FIGS. 4A-4B illustrate an external view of another example outrunner brushless motor.
Figure 4B:
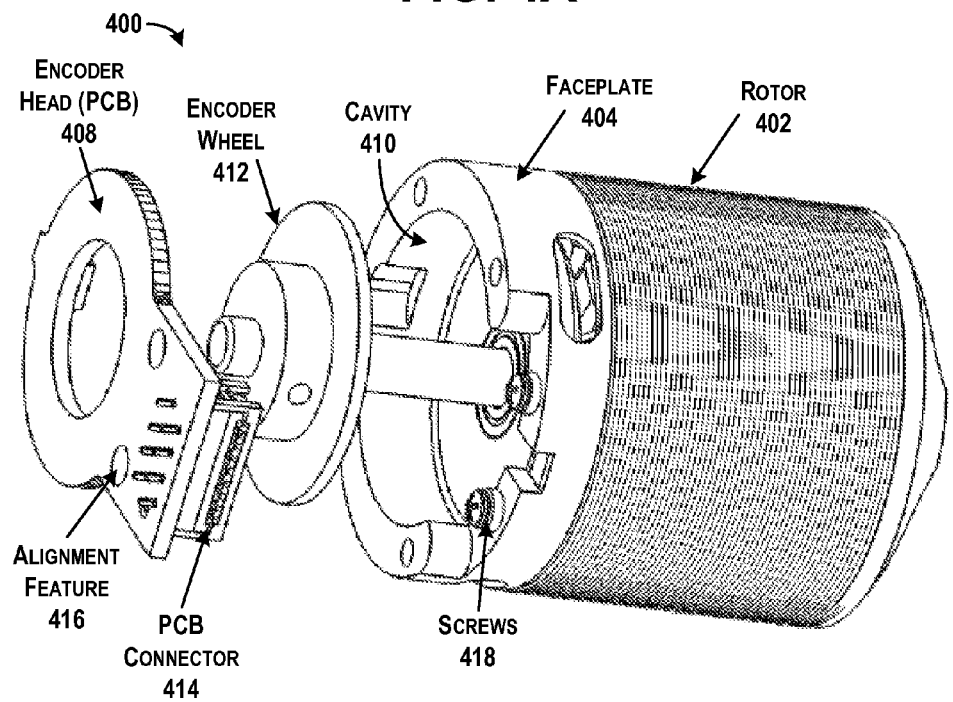

FIGS. 4A-4B illustrate an external view of another example outrunner brushless motor 400. In FIG. 4A, the motor 400 is shown to include a rotor 402 coupled to a faceplate 404, and a motor output 406 exits the faceplate 404. An encoder head 408 is provided in a cavity 410 or cut-out of the faceplate 404 for providing an output indicative of an angular position of a code wheel coupled to the motor output 406. The encoder head 408 may be in the form of a printed circuit board (PCB) to receive the output indicative of the angular position of the code wheel and determine the angular position of the code wheel. The encoder head 408 may include a sensor pointing toward the code wheel underneath the encoder head 408 in the cavity 410 to be able to read the code wheel, or detect rotations of the code wheel. The faceplate 404 provides alignment between the code wheel, motor output 406, and the encoder head 408, for example.

The encoder head 408 allows for alternative connections to the motor 400. The encoder head 408 connections sits outside of the faceplate 404 and includes an encoder reader (e.g., such as a reflective IR encoder reader) that bounces IR signals off of a code wheel (e.g., a reflective disc) and reads pulses as the code wheel spins.

FIG. 4B illustrates an exploded view of the motor 400. An encoder wheel 412 is shown embedded into the cavity 410, and the encoder head (PCB) 408 is positioned on top of the encoder wheel 412 in the cavity 410. A PCB connector 414 is coupled to an end of the encoder head (PCB) 408, and may be an electrical connector extending outside of the cavity 410 to provide an output of the encoder.

As shown in FIG. 4A, the encoder head (or PCB) 408 may act as a seal of the cavity 410 of the faceplate 404 to seal the encoder disc from dust, or an external environment, for example. The encoder head (PCB) 408 can include holes or alignment features 416 to enable the encoder head (PCB) 408 to align to corresponding features on a surface of the faceplate 404 by mating to pins or moldings in the faceplate and attaching to the faceplate 404 with set screws 418, for example.

In some examples, the faceplate 404 may act as a heat sink for the motor 400 to provide a thermal path out of the motor 400. With the encoder head (PCB) 408 on a surface of the faceplate 404, a surface area of the faceplate 404 is reduced, and the thermal path may also be reduced. Thus, it may be desired to provide an encoder head having a small surface area to enable larger thermal transmission.

Figure 5:
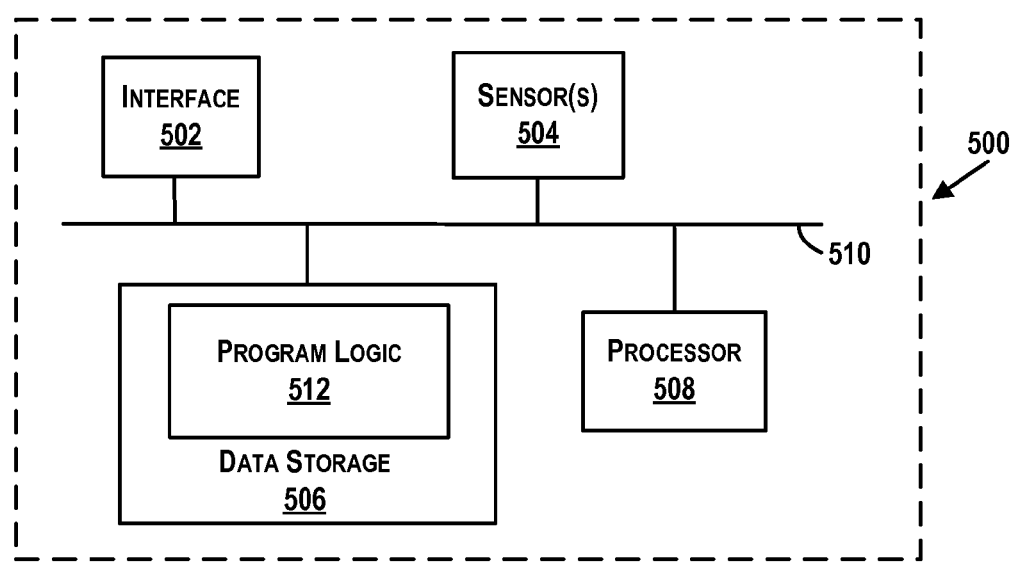
FIG. 5 illustrates a schematic drawing of an example computing device.

Components of the motor 400 may take the form of a computing device, such as components of the encoder head 408, for example. FIG. 5 illustrates a schematic drawing of an example computing device 500. The device 500 may include an interface 502, sensor(s) 504 (e.g., IR sensor), data storage 506, and a processor 508. Components illustrated in FIG. 5 may be linked together by a communication link 510. The device 500 may also include hardware to enable communication within the device 500 and between the device 500 and another computing device (not shown), such as a server entity. The hardware may include transmitters, receivers, and antennas, for example.

The interface 502 may be configured to allow the device 500 to communicate with another computing device (not shown), such as a server. Thus, the interface 502 may be configured to receive input data from one or more computing devices, and may also be configured to send output data to the one or more computing devices. The interface 502 may include a receiver and transmitter to receive and send data.

The sensor 504 may include one or more sensors, or may represent one or more sensors included within the device 500. Example sensors include an IR sensor, a light sensor, a camera, or other sensors that may collect data of a code wheel or spinning disc and provide the data to the data storage 506 or processor 508.

The processor 508 may be configured to receive data from the interface 502, sensor 504, and data storage 506. The data storage 506 may store program logic 512 that can be accessed and executed by the processor 508 to perform functions executable to determine an angular position of a code wheel, for example. Any functions described herein, or other example functions for outrunner motors may be performed by the device 500 or processor 508 of the device via execution of instructions stored on data storage 506.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An outrunner brushless motor comprising:
    a motor shaft;
    a stationary stator;
    a rotor coupled to the motor shaft and provided external to the stationary stator for rotating around the stationary stator to cause rotation of the motor shaft;
    a faceplate coupled to the stationary stator, wherein the faceplate includes a cavity, and the faceplate abuts and is connected to a chassis; and
    an encoder embedded into the cavity of the faceplate, wherein the encoder comprises a code wheel coupled to the motor shaft and rotates due to rotation of the motor shaft and a read head attached to the faceplate for providing an output indicative of an angular position of the code wheel, wherein the faceplate provides alignment between the code wheel and the read head.

2. The outrunner brushless motor of claim 1, wherein the read head comprises a printed circuit board (PCB) provided inside the cavity of the faceplate for reading the angular position of the code wheel.

3. The outrunner brushless motor of claim 2, wherein the cavity of the faceplate includes pins to mate to holes in the PCB for alignment.

4. The outrunner brushless motor of claim 1, wherein the read head comprises a printed circuit board (PCB) provided inside the cavity of the faceplate and an electrical connector extending outside of the cavity to provide an output of the encoder.

5. The outrunner brushless motor of claim 4, wherein the PCB closes the cavity and seals the encoder from an external environment.

6. The outrunner brushless motor of claim 1, wherein the faceplate is provided at a front of the motor and the rotor is provided at a back of the motor such that the front of the motor is stationary and the back of the motor rotates.

7. The outrunner brushless motor of claim 1, wherein the code wheel has a diameter smaller than a diameter of the cavity of the faceplate.

8. The outrunner brushless motor of claim 1, wherein the encoder comprises an optical encoder.

9. The outrunner brushless motor of claim 1, wherein the faceplate has an opening through which the motor shaft is provided, and the encoder has an opening through which the motor shaft is provided.

10. The outrunner brushless motor of claim 1, wherein the faceplate is stationary and the rotor rotates relative to the faceplate.

11. The outrunner brushless motor of claim 1, wherein the code wheel rotates with rotation of the motor shaft and the read head is coupled to the faceplate and remains stationary.

12. The outrunner brushless motor of claim 1, wherein the cavity of the faceplate includes an indentation into which the encoder is placed and within which a seal plate is provided to close the cavity such that the seal plate is substantially flush with the faceplate.

13. The outrunner brushless motor of claim 1, further comprising a cable coupled to the read head and provided through a surface of the faceplate.

14. The outrunner brushless motor of claim 1, further comprising a seal plate to close the cavity and seal the encoder from an external environment.

15. An outrunner brushless motor comprising:
    a rotatable motor shaft;
    a faceplate for coupling to a chassis and having an opening through which the rotatable motor shaft is provided, wherein the faceplate includes a cavity and when coupled the faceplate abuts and is connected to the chassis; and
    an encoder embedded into the cavity of the faceplate, wherein the encoder comprises a code wheel coupled to the rotatable motor shaft and a read head for providing an output indicative of an angular position of the code wheel, wherein the faceplate provides alignment between the code wheel and the read head.

16. The outrunner brushless motor of claim 15, further comprising a shaft bearing coupled to the faceplate and enabling the rotatable motor shaft to rotate within the faceplate.

17. The outrunner brushless motor of claim 16, wherein the code wheel is coupled to the rotatable motor shaft adjacent to the shaft bearing.

18. An outrunner brushless motor comprising:
a rotatable motor shaft;
a faceplate having an opening through which the rotatable motor shaft is provided, wherein the faceplate is provided at a front of the motor such that the front of the motor is stationary and a back of the motor rotates with the rotatable motor shaft, and wherein the faceplate includes a cavity, and the faceplate is for coupling to a chassis and when coupled the faceplate abuts and is connected to the chassis; and
an encoder embedded into the cavity of the faceplate for providing an output indicative of an angular position of the motor, wherein the encoder comprises a code wheel coupled to the rotatable motor shaft and a printed circuit board (PCB) for providing an output indicative of an angular position of the code wheel, wherein the faceplate provides alignment between the code wheel and the PCB.

19. The outrunner brushless motor of claim 18, wherein the cavity includes a machined encoder head seat into which the encoder is embedded.

20. The outrunner brushless motor of claim 18, further comprising a seat on a surface of the faceplate into which a seal plate is provided to seal the cavity.

* * * * *